United States Patent
Sorsa

(10) Patent No.: US 6,424,945 B1
(45) Date of Patent: Jul. 23, 2002

(54) VOICE PACKET DATA NETWORK BROWSING FOR MOBILE TERMINALS SYSTEM AND METHOD USING A DUAL-MODE WIRELESS CONNECTION

(75) Inventor: Mika T. Sorsa, Helsinki (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 09/461,392

(22) Filed: Dec. 15, 1999

(51) Int. Cl.[7] .......................... G10L 11/02; G10L 21/02; G10L 21/06
(52) U.S. Cl. ...................... 704/270.1; 704/275; 704/270
(58) Field of Search .................. 704/270, 275, 704/270.1, 231–245, 251–257, 258

(56) References Cited

U.S. PATENT DOCUMENTS

| | | | |
|---|---|---|---|
| 5,774,628 A | 6/1998 | Hemphill | 395/2.64 |
| 5,799,063 A | 8/1998 | Krane | 395/67 |
| 5,884,262 A | 3/1999 | Wise et al. | 704/270 |
| 5,884,266 A | 3/1999 | Dvorak | 704/275 |
| 5,890,123 A | 3/1999 | Brown et al. | 704/275 |
| 5,953,392 A | 9/1999 | Rhie et al. | 379/88.13 |
| 5,956,683 A * | 9/1999 | Jacobs et al. | 704/270 |
| 6,188,985 B1 * | 2/2001 | Thrift et al. | 704/275 |
| 6,230,132 B1 * | 5/2001 | Class et al. | 704/270 |

FOREIGN PATENT DOCUMENTS

| | | | |
|---|---|---|---|
| EP | 0 847 179 A2 | 6/1998 | H04M/7/00 |
| EP | 0 854 417 A2 | 7/1998 | G06F/3/16 |
| EP | 0 854 418 A2 | 7/1998 | G06F/6/16 |
| EP | 0 859 500 A2 | 8/1998 | H04M/7/000 |
| EP | 0 872 827 A2 | 10/1998 | G10L/3/00 |
| EP | 0 878 948 A2 | 11/1998 | H04M/7/000 |
| EP | 0 959 401 A2 | 11/1999 | G06F/3/16 |
| GB | 2 317 070 A | 3/1998 | |
| WO | 97/32427 | 9/1997 | |
| WO | 97/40611 | 10/1997 | |
| WO | 98/21872 | 5/1998 | |
| WO | 99/25108 | 5/1999 | |

OTHER PUBLICATIONS

Kilmartin et al ("Real Time Stock Price Distribution Utilising the GSM Short Messaging Service", 1997 IEEE International Conference on Personal Wireless Communications, pp. 399–403 © Dec. 1997).*
Friel et al ("An Automated Stock Price Delivery System Based on the GSM Short Message Service", 1998 IEEE International Conference on Personal Wireless Communications, pp. 1591–1595 vol. 3 © Jun. 1998).*
Kawahara T et al: "Key–Phrase Detection and Verification for Flexible Speech Understanding", Proceedings of International Conference on Spoken Language Processing, XX, XX, vol. 2, Oct. 3, 1996, pp 861–864, XP002080839, paragraph '0004.

* cited by examiner

Primary Examiner—Richemond Dorvil
Assistant Examiner—Daniel A. Nolan
(74) Attorney, Agent, or Firm—Antonelli, Terry, Stout & Kraus, LLP

(57) ABSTRACT

A system and method for voice browsing IVR services using a mobile terminal. A voice application is accessible via a server connected to a network. A call connection is established between the mobile terminal and the server using a dual-mode connection. The call connection includes a voice mode and a data mode for alternately transmitting voice and data via the network. The voice application sends a state-dependent grammar that defines the speech recognition results that the voice application is ready to accept as input or commands at its present state of execution. The voice application also sends to the mobile terminal state-dependent voice output such as audio prompts and instructions using the voice mode. The user responds orally to the voice output. The mobile terminal processes this voice input using speech recognition facilities. Valid input is extracted from the voice input based on the state-dependent grammar. The mobile terminal sends the valid input to the voice application using the data mode. The voice application updates its state of execution based on the valid input.

10 Claims, 3 Drawing Sheets

VOICE PACKET DATA NETWORK BROWSING FOR MOBILE TERMINALS SYSTEM AND METHOD USING A DUAL-MODE WIRELESS CONNECTION

BACKGROUND OF THE INVENTION

1. Field of the Invention

The present invention relates generally to interactive voice response systems, and more particularly to voice browsing with a mobile terminal that uses a dual-mode wireless connection.

2. Related Art

As society becomes increasingly mobile, the need for immediate communications, instant access to data, and the ability to act on that data is critical. Far more people today have access to a telephone than have access to a computer with an Internet connection. In addition, sales of cellular telephones are booming, so that many people already have or soon will have a phone within reach wherever they go. Voice browsers offer the promise of allowing everyone to access packet data network based services from any phone, making it practical to access the packet data network any time and any where, whether at home, on the move, or at work.

Voice browsers allow people to access the Internet using speech synthesis, pre-recorded audio, and speech recognition. This can be supplemented by keypads and small displays. Voice may also be offered as an adjunct to conventional desktop browsers with high resolution graphical displays, providing an accessible alternative to using the keyboard or screen, for instance in automobiles where hands/eyes free operation is essential, or for use by people with visual impairments. Voice interaction can escape the physical limitations on keypads and displays as mobile devices become ever smaller.

Packet data networks offer the potential to vastly expand the opportunities for voice-based applications. Pages in packet data networks define the scope of the dialog with the user, limiting interaction to navigating the page, traversing links and filling in forms. In some cases, this may involve the transformation of packet data network content into formats better suited to the needs of voice browsing. In others, it may prove effective to author content directly for voice browsers.

Modem interactive voice response (IVR) services provide users with direct access to information stored in databases, saving companies time and money. For example, users can utilize IVR services to access voice mail, E-mail, keep track of appointments and contacts, and access stocks and news. Voice Browsers offer a great fit for the next generation of call centers, which will become packet data network portals to the company's services and related packet data network sites, whether accessed via the telephone network or via the Internet. Users will be able to choose whether to respond by a key press or a spoken command. Voice interaction holds the promise of naturalistic dialog with packet data network-based services.

Many companies today provide commercial IVR servers, including Brite Voice Systems, Syntellect Inc., and Inter-Voice Inc. Others provide voice browsers, such as the Audio Web Research Team, Productivity Works, and General Magic, Inc.

Successful speech recognition is key to the success of IVR services. Typically speech recognition processing is performed at the server using dedicated software and hardware because most mobile terminals don't have the processing capability and memory resources to effectively perform natural language recognition locally. Performing terminal-side speech recognition is advantageous because it relieves the burden on IVR service providers of having to provide speech recognition capabilities. This is particularly important where the service supports a large number of concurrent users. However, natural language recognition requires a large grammar to achieve acceptable results. Even more limited grammars associated with particular applications can be relatively large. Performing speech recognition using these grammars is beyond the modest capabilities of many low cost mobile terminals. This problem is more acute where multiple grammars are stored within a mobile terminal, for example where a mobile terminal accesses multiple voice applications.

In European Patent Application No. 0854417A2 entitled "Voice Activated Control Unit" (published Jul. 22, 1998; applicant: Texas Instruments Inc.), a wireless voice-controlled device is described that permits a user to browse a hypermedia network, such as the World Wide Web, with voice commands. This reference discloses the use of grammar files stored within the mobile terminal for speech recognition, but does not describe using limited size grammars to achieve more accurate speech recognition.

A need therefore exists for an improved system and method for providing IVR services, where accurate speech recognition is achieved using a mobile terminal having modest processing capability and memory resources, where the speech recognition uses grammars having a limited size.

SUMMARY OF THE INVENTION

The present invention is directed to a system and method for voice browsing IVR services using a mobile terminal. A voice application provided by the IVR service is accessible via a server connected to a network. A call connection is established between the mobile terminal and the server using a dual-mode connection, i.e., the call connection includes a voice mode and a data mode for alternately transmitting voice and data via the network. The voice application sends a grammar to the mobile terminal using the data mode, where the grammar defines the speech recognition results that the voice application is ready to accept as input or commands at its present state of execution. The voice application also sends to the mobile terminal speech content corresponding to the present state of execution such as audio prompts and instructions using the voice mode. The user responds orally to the speech content. The mobile terminal processes this voice input using speech recognition facilities. Valid input is extracted from the voice input based on the current grammar. The mobile terminal sends the valid input to the voice application using the data mode. The voice application continues execution based on the valid input.

The present invention exploits a feature offered by some communications networks that allows for dual-mode call connections having a voice mode and a data mode. Using this dual-mode connection, the mobile terminal and server can alternately exchange voice and data during a single call connection. State-dependent binary data can be therefore downloaded at the mobile terminal interspersed with voice communications.

An advantage of the present invention is that accurate terminal-side speech recognition is achieved with mobile terminals using modest memory and processing power. State-dependent grammars are downloaded at the mobile terminal using the data mode of the call connection. Because the grammar need only define valid speech recognition results for the voice application at its present state of execution, the state-dependent grammar can be relatively small compared to a natural language grammar. Smaller grammars reduce the processing capabilities and memory resources required at the mobile terminal, and allow for accurate speech recognition results using conventional statistical algorithms.

Another advantage of the present invention is that IVR service providers are not required to invest in and maintain dedicated resources for speech recognition, since speech recognition is accomplished within the mobile terminal. This is particularly important where the IVR service supports a large number of concurrent users.

Another advantage of the present invention is that speaker-dependent characteristics can be stored locally in the mobile terminal and used to improve the accuracy of terminal-side speech recognition. Speaker-dependent speech recognition is therefore achieved without requiring that the speaker-dependent characteristics be stored by the IVR service providers.

Another advantage of the present invention is that IVR service providers can update and maintain their voice applications at the server without requiring modification to the terminal software.

Further features and advantages of the invention, as well as the structure and operation of various embodiments of the invention, are described in detail below with reference to the accompanying drawings.

BRIEF DESCRIPTION OF THE FIGURES

The present invention will be described with reference to the accompanying drawings. In the drawings, like reference numbers generally indicate identical, functionally similar, and/or structurally similar elements. The drawing in which an element first appears is indicated by the leftmost digit in the corresponding reference number.

DETAILED DESCRIPTION OF THE PREFERRED EMBODIMENTS

Overview of the Environment

The present invention is directed to a system and method for voice browsing IVR services using a mobile terminal. A voice application provided by the IVR service is accessible via a server connected to a network. A call connection is established between the mobile terminal and the server using a dual-mode connection, i.e., the call connection includes a voice mode and a data mode for alternately transmitting voice and data via the network. The voice application sends a grammar to the mobile terminal using the data mode, where the grammar defines the speech recognition results that the voice application is ready to accept as input or commands at its present state of execution (i.e., a state-dependent grammar). The voice application also sends to the mobile terminal state-dependent speech content such as audio prompts and instructions using the voice mode. The user responds orally to the speech content. The mobile terminal processes this voice input using speech recognition facilities. Valid input is extracted from the voice input based on the current grammar. The mobile terminal sends the valid input to the voice application using the data mode. The voice application continues execution based on the valid input.

Figure 1:
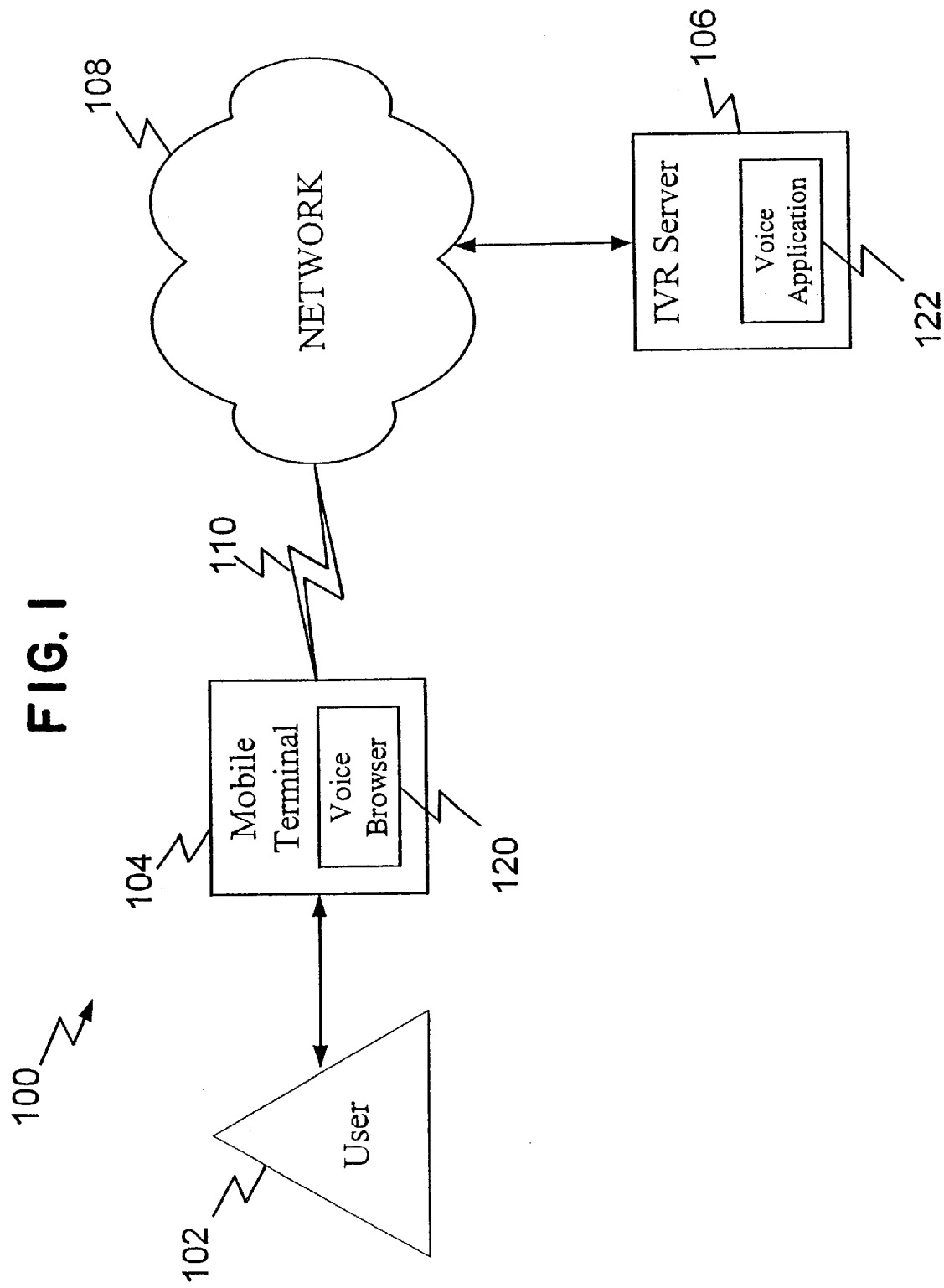
FIG. 1 depicts a wireless communications environment within which the present invention is used.

FIG. 1 depicts a wireless communications environment 100 within which the present invention is used. Communications environment 100 includes a user 102, a mobile terminal 104, an IVR server 106, a network 108, and a wireless link 110. The present invention includes two computer processes that work together in synchronization to produce the functionality described herein: a voice browser 120 and a voice application 122. Voice browser 120 resides in mobile terminal 104, whereas voice application 122 is accessible via server 106.

In a preferred embodiment, network 108 represents a Global System for Mobile (GSM) communications network. GSM is a digital cellular radio network operating in over 200 countries world-wide. Because GSM is digital, GSM-enabled mobile terminals (referred to as mobile stations in GSM literature) can easily be used to send or receive e-mail, faxes, browse the Internet, securely access a LAN/intranet, and use other digital data features. The GSM architecture is based on the Integrated Services Digital Network (ISDN) call model. GSM network operators can therefore offer integrated voice, high speed data, fax and short message services capabilities from one network.

In an alternative embodiment, network 108 represents a combined GSM and General Packet Radio Service (GPRS) network. GPRS involves overlaying a packet based air interface on the existing circuit switched GSM network. This gives the user an option to use a packet-based data service. In other alternative embodiments, network 108 can represent any network or combination of networks capable of providing voice and data call connections.

Mobile terminal 104 can represent many different communication devices. In the preferred GSM network embodiment, mobile terminal 104 preferably represents a GSM-enabled digital cellular telephone. GSM-enabled mobile terminals have a "smart card" inside called the Subscriber Identity Module (SIM). The SIM card identifies and authenticates the user to the network. Alternatively, mobile terminal 104 can represent laptop computers and personal digital assistants (PDAs) that have wireless communication capability, mobile units that typically include a hand set and a car kit (the car kit provides battery power, a higher RF power output and a higher gain antenna), and custom devices designed for the particular voice browsing application described herein. Further, the present invention does not depend upon mobile terminal 104 employing any particular modulation scheme. For example, mobile terminal 104 can employ frequency, phase, code division, or time division multiplexing schemes. In the preferred GSM network environment, mobile terminal 104 employs a combination of Time- and Frequency-Division Multiple Access (TDMA/FDMA) modulation.

Mobile terminal 104 and network 108 preferably communicate using a dual-mode alternating voice and data connection. This alternating voice and data connection is specified in the GSM network standards. Utilizing this alternating voice and data connection allows the present invention to operate using a single traffic connection. In an alternative embodiment, GPRS data packets are used for data communication and a simultaneous GSM voice call is used for voice transmission.

Wireless link 110 represents the air interface or radio link for two-way communication link between mobile terminal 104 and network 108. In the preferred GSM embodiment, wireless link 110 represents the Um air interface between mobile terminals and base station subsystems (not shown). In other alternative embodiments, wireless link 110 will vary according to the particular network 108 and mobile terminal 104.

IVR server 106 represents a conventional computer configured to act as a file server. Server 106 communicates with network 108, and is accessible to remote clients via network 108.

Voice browser 120 and voice application 122 are described in greater detail below in conjunction with the operation of the present invention.

Interactive Voice Response System

Figure 2:
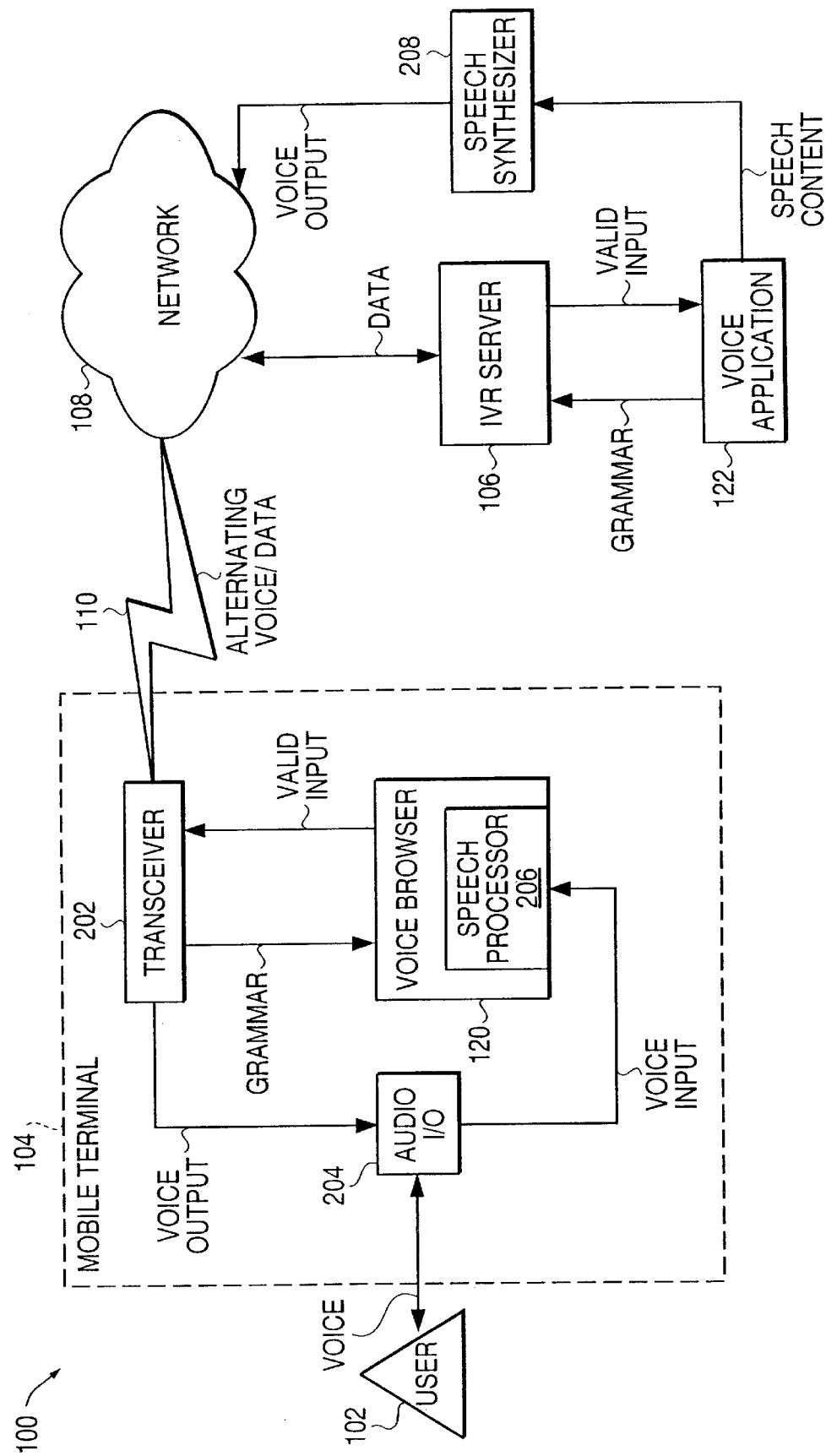
FIG. 2 depicts the wireless communications environment in greater detail.

FIG. 2 depicts wireless communications environment 100 in greater detail according to a preferred embodiment of the present invention. Mobile terminal 104 includes a transceiver 202, audio input/output (I/O) devices 204, as well as voice browser 120. Voice browser 120 includes a speech processor 206. Further, voice application 122 (accessible via server 106 as shown in FIG. 2) accesses a speech synthesizer 208 connected to network 108.

Transceiver 202 represents a conventional radio unit capable of transmitting and receiving information via wireless link 110 for two-way communication with network 108. For example, transceiver 202 can represent the radio unit used in a conventional cellular telephone for establishing a wireless connection with a cellular service. Those skilled in the art will recognize that transceiver 202 will vary according to the type of network 108 within which mobile terminal 104 is used. The design of transceiver 202 can vary, for example, based on the particular modulation scheme used by network 108 (e.g., code division multiple access (CDMA) networks require different transceivers than do frequency division multiple access (FDMA) networks), or based on whether network 108 is a terrestrial or satellite network.

Audio I/O 204 represents conventional devices used for outputting audio information to user 102 (e.g., one or more speakers) and for gathering audio information from user 102 (e.g., one or more microphones). Those skilled in the art will recognize that the design of audio I/O 204 can vary based on the design of mobile terminal 104. Audio I/O 204 is connected to receive a voice output signal from transceiver 202 for output to user 102, and to send a voice input signal captured from user 102 to speech processor 206.

Voice browser 120 performs the terminal-side logic and control of the present invention. Voice browser 120 is connected to receive a state-dependent grammar from transceiver 202. Speech processor 206 is implemented as an algorithm for recognizing speech within a voice input signal. Many different speech recognition algorithms are known in the art. In a preferred embodiment, speech processor 206 is implemented as a statistical algorithm for speech recognition, such as Hidden Markov Models or clustering methods. These algorithms are well suited to finding the most probable match between a voice input and a relatively small grammar (e.g., a dozen words or phrases). Speech processor 206 extracts valid input from the voice input signal based on the current grammar. Voice browser 120 sends the extracted valid input to voice application 122 via transceiver 202, wireless link 110, network 108, and sever 106. The functions performed by voice browser 120 are described in further detail below with respect to FIG. 3.

Voice browser 120 can be implemented as hardware, software, or a combination of both. Voice browser 120 is preferably capable of interpreting a markup language, such as VoiceXML, SpeechML or other similar language used for speech-enabled browsers. The markup language should describe the speech content (i.e., the audio output), voice commands (including their grammar and rules for state transition, which in the current invention is state-dependent), and voice input items (and actions corresponding to the input items). Speech processor 206 is preferably implemented as a computer program running on a digital signal processing (DSP) processor. The same DSP processors may be used for both network signaling (GSM calls in the preferred GSM network embodiment) and for speech processing. Sharing DSP resources results in a more cost effective design, but can overburden the hardware when there is a call connection during speech processing. The extent to which this is an issue depends upon network features (e.g., modulation) and the properties of the DSP hardware.

Voice application 122 performs the server-side logic and control of the present invention. Voice application 122 can represent many different and varied IVR services known in the art, such as accessing voice-activated dialing, voice messaging, email, faxes, browsing the Internet, and other interactive voice-driven applications. Voice application 122 sends grammars and other data content to voice browser 120 via IVR server 106, network 108, wireless link 110 and transceiver 202. As described above, voice application 122 receives valid input in return from voice browser 120 along the same path. Further, voice application 122 sends state-dependent speech content to speech synthesizer 208. As with voice browser 120, voice application 122 can be implemented as hardware, software, or a combination of both. As with voice browser 120, voice application 122 is preferably capable of interpreting a markup programming language.

Speech synthesizer 208 converts speech content received from voice application 122 into a voice signal that is sent via network 108, wireless link 110, and transceiver 202 to audio I/O 204 for audio output to user 102. The speech content is a data stream that indicates a desired sequence of one or more words or sounds. In a preferred embodiment, speech synthesizer 208 uses the speech content to generate a digital voice output signal in a format that is recognized by voice decoder drivers (i.e., "codecs") available at that mobile terminal DSP. However, this preferred embodiment requires that speech synthesizer 208 be aware of which voice decoder drivers are available at each mobile terminal 104. In an alternative embodiment, speech synthesizer 208 uses the speech content to generate a digitized audio signal. In another alternative embodiment, speech synthesizer 208 can access pre-recorded audio message from storage rather than synthesizing a voice signal. These audio messages can include, for example, voices, sounds, music, and signals. In another alternative embodiment (not shown), the voice signal can originate from sources other than speech synthesizer 208, such as a human operator or another concurrent user of voice application 122.

Operation of the Present Invention

Figure 3:
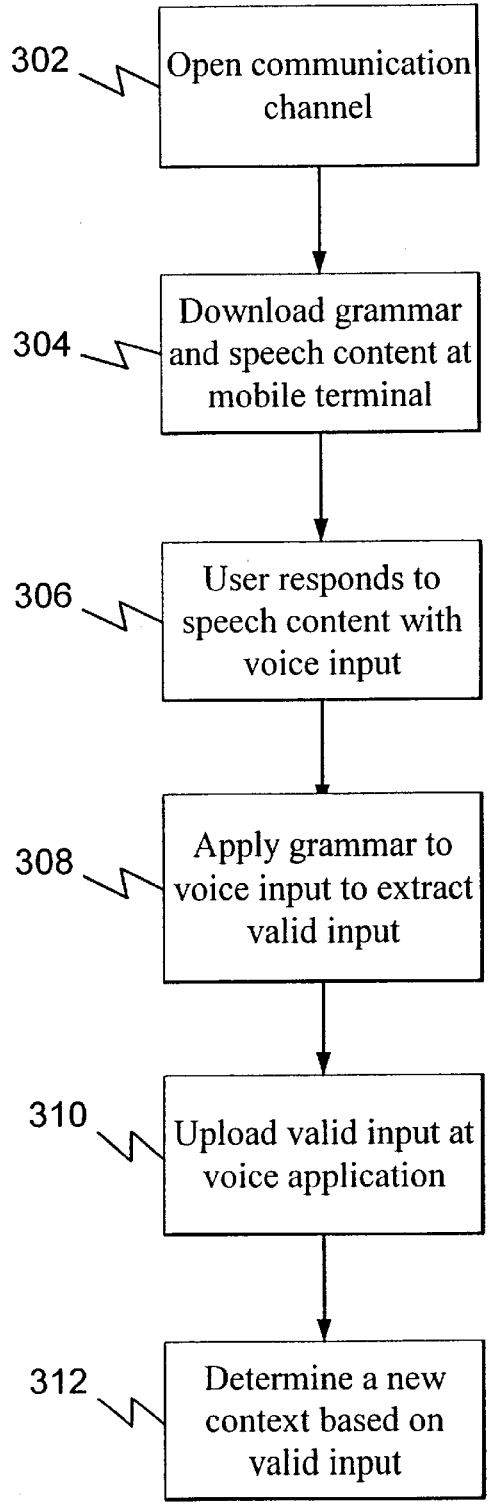
FIG. 3 depicts a flowchart that describes a preferred method according to the present invention of allowing a user to interact with a voice application using a mobile terminal.

FIG. 3 depicts a flowchart 300 that describes a preferred method according to the present invention of allowing user 102 to interact with voice application 122 using mobile terminal 104. In step 302, a dual-mode communications channel between mobile terminal 104 and server 106 is opened. The communications channel can be initiated by either mobile terminal 104 or server 106. Once the communications channel has been opened, voice browser 120 and voice application 122 are activated.

The dual-mode communications channel includes a data mode and a voice mode, so that binary data and voice can be alternately sent over the same channel without having to establish a new call with each switch between voice and data. In the preferred GSM network embodiment, communications channels are established using a proposed service that provides the capability of swapping between speech and data during a call. This proposed connection service is described in GSM 02.02; "Digital cellular telecommunications system (Phase 2+); Bearer Services (BS) supported by a GSM Public Land Mobile Network (PLMN)," European Standard (Telecommunications Series) ETS 300904, European Telecommunications Standards Institute (ETSI). GSM 02.02 does not define how to implement the control of the data mode. In other network access systems, such as Digital European Cordless Telecommunications (DECT) systems, these controls are addressed in a more comprehensive way, such as is described in DECT[a] ETSI ETS 300 175: "Radio Equipment and Systems (RES)"; DECT; European Telecommunications Standards Institute, 1996 (including, for example, specifications ETS 300 175-1 and ETS 300 175-2).

In the alternative GSM/GPRS network embodiment, GPRS data packets are used for the data mode and a simultaneous GSM voice call is used for the voice mode, such as is described in GPRS[b]: ETSI TS 101 356, Digital cellular telecommunications system (Phase 2+); General Packet Radio Service (GPRS); Mobile Station (MS) supporting GPRS; European Telecommunications Standards Institute, 1999.

In step 304, a grammar and speech content are downloaded at mobile terminal 104 corresponding to the current state of execution of the voice application. The execution of voice application 122 can pass from one state to a new state based on either commands or input from user 102. A unique grammar and speech content can be associated with each state. A grammar defines the speech recognition results that the voice application is ready to accept as valid user input or commands at its present state of execution.

As shown in FIG. 2, voice application 122 sends the grammar to voice browser 120 via server 106, network 108, wireless link 110, and transceiver 202. The grammar is preferably described using binary data, and is therefore communicated via the data mode. Mobile terminal 104 can include output interfaces other than audio, such as a graphical display (not shown). In this alternative embodiments, additional data can be downloaded at mobile terminal 104 to drive these additional interfaces.

The speech content includes audio information to be presented to user 102 corresponding to the current state of execution, such as prompts for input or information content requested by the user. The speech content output by voice application 122 describes various words or phrases using digital data. Speech synthesizer 208 transforms the speech content into a voice output signal, which is then sent to audio I/O 204 for audio output to user 102 via network 108, wireless link 110, and transceiver 202. As described above, the voice signal is preferably formatted as a digital voice output signal in a format that is recognized by the mobile terminal codecs.

In step 306, user 102 hears the audio output via audio I/O 204 corresponding to the speech content, and responds orally with voice input. Speech processor 206 receives the voice input signal via audio I/O 204.

In step 308, the grammar associated with the current state is applied to the user's voice input using a speech recognition algorithm. As discussed above, a statistical algorithm for speech recognition is preferably used by speech processor 206. Valid input (as defined in the grammar), if any, is extracted from the voice input. Since a different grammar can be defined for each state, each grammar need only include those words or phrases relevant to the current state. The size of each grammar can therefore be kept relatively small compared to grammars for natural language recognition. For example, many states associated with voice applications can be described using a grammar having a dozen words/phrases or less. With grammars of this size, statistical speech recognition methods can be used and implemented with little memory and modest processing power. Further, because speech processor 206 is located within mobile terminal 104, the speech recognition algorithm can be optimized to recognize voice input from a particular user by saving speaker-dependent characteristics locally. Those skilled in the art will recognize that the particular speaker-dependent characteristics that are used by a speech recognition algorithm will vary for different algorithms.

Depending upon the state, a grammar defines valid input that can include user input and commands. For example, if the speech content corresponding to the current state is a prompt for user input (e.g., "Please state your name after the tone"), then user 102 orally responds to the prompt with the requested information (e.g., "Chris Smith"). As a further example, in some voice applications 122 user 102 can speak one or more commands to cause a certain action (e.g., "Go to E-mail"). Further still, a state can define valid input for local use, i.e., user input or commands that are used by mobile terminal 104. For example, a local command "Repeat" can cause the mobile terminal 104 to repeat the last audio output. Those skilled in the art will recognize that the speech content, user input and commands will vary according to the particular voice application 122.

In step 310, the valid input extracted in step 308 is uploaded at voice application 122. In step 312, voice application 122 determines whether execution will proceed to a new state based on the valid input. Steps 304 through 310 are repeated until voice application 122 ceases execution.

It is important that voice browser 120 and voice application 122 are synchronized as they proceed from one state to the next. To insure that synchronization is maintained, grammars downloaded at mobile terminal 104 identify the state with which the grammar is associated. Similarly, valid data uploaded at server 106 identifies the state with which the data is associated.

CONCLUSION

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

While the invention has been particularly shown and described with reference to preferred embodiments thereof, it will be understood by those skilled in the art that various changes in form and details may be made therein without departing from the spirit and scope of the invention.

What is claimed is:

1. An interactive voice response (IVR) system, comprising:
    a network;
    a server coupled to said network;
    a voice application accessible via said server; and
    a mobile terminal, wherein a call connection having a data mode and a voice mode is established between said mobile terminal and said server, including:
        a transceiver for establishing a wireless link between said mobile terminal and said network, wherein said transceiver is coupled to receive from said voice application a state-dependent grammar using said data mode and state-dependent voice output using said voice mode, an audio input/output (I/O) which outputs said voice output to a user and receives voice input from said user, and a speech processor for extracting valid input from said voice input based on said grammar, wherein said transceiver sends said valid input to said voice application via said data mode.

2. The system of claim 1, wherein said network is a Global System for Mobile (GSM) communications network.

3. The system of claim 1, wherein said network is a combined GSM and General Packet Radio Service (GPRS) network, and wherein said data mode is established as a data connection within GPRS and said voice mode is established as a voice call within GSM.

4. The system of claim 1, wherein said mobile terminal comprises a GSM-enabled digital cellular telephone.

5. The system of claim 1, wherein said speech processor stores speaker-dependent characteristics corresponding to said user.

6. The system of claim 1, wherein voice application generates speech content corresponding to the current state of said voice application, and wherein said system further comprises a speech synthesizer coupled to receive said speech content which generates said state-dependent voice output based on said speech content.

7. The system of claim 1, wherein said speech processor applies a Hidden Markov Model speech recognition algorithm for extracting said valid input.

8. The system of claim 1, wherein said speech processor applies a clustering method speech recognition algorithm for extracting said valid input.

9. The system of claim 1, wherein said audio I/O comprises an audio speaker and a microphone.

10. A method for allowing a user to interact with a voice application using a mobile terminal, wherein the voice application is accessible via a server coupled to a network, and wherein the mobile terminal communicates with the network via a wireless link, comprising the steps of:

(a) opening a call connection between the mobile terminal and the server, wherein said call connection includes a voice mode and a data mode;

(b) downloading at the mobile terminal a state-dependent grammar and state-dependent voice output, wherein said grammar is sent using said data mode and said voice output is sent using said voice mode;

(c) outputting said voice output to the user;

(d) receiving voice input from the user;

(e) applying said grammar to said voice input, thereby extracting valid input;

(f) uploading said valid input at the server; and (g) determining a new state based on said valid input.

* * * * *